United States Patent [19]

Inoue

[11] Patent Number: 4,629,855

[45] Date of Patent: Dec. 16, 1986

[54] ELECTROEROSIVE CUTTING METHOD AND APPARATUS WITH A BAR-SUPPORTED ELECTRODE TAPE

[75] Inventor: Kiyoshi Inoue, Tokyo, Japan

[73] Assignee: Inoue-Japax Research Incorporated, Kanagawaken, Japan

[21] Appl. No.: 682,842

[22] Filed: Dec. 18, 1984

[30] Foreign Application Priority Data

Dec. 19, 1983 [JP] Japan .................................. 58-237958
Dec. 21, 1983 [JP] Japan .................................. 58-239824

[51] Int. Cl.$^4$ .............................................. B23H 7/10
[52] U.S. Cl. ................................ 219/69 W; 204/129.1; 204/206; 219/69 M
[58] Field of Search ............... 219/69 W, 69 U, 69 M, 219/69 E, 69 R; 204/206, 129.1

[56] References Cited

U.S. PATENT DOCUMENTS

| | | | |
|---|---|---|---|
| 2,802,929 | 8/1957 | Fefer et al. | 219/69 W |
| 2,903,557 | 9/1959 | Matulaitis | 219/69 W |
| 3,035,150 | 5/1962 | Connoy | 219/69 W |
| 4,301,349 | 11/1981 | Inoue | 219/69 V |
| 4,314,133 | 2/1982 | Pfau et al. | 219/69 W |
| 4,386,248 | 5/1983 | Inoue | 219/69 W |

FOREIGN PATENT DOCUMENTS

| | | | |
|---|---|---|---|
| 139913 | 12/1960 | U.S.S.R. | 219/69 E |
| 315557 | 11/1971 | U.S.S.R. | 219/69 W |

Primary Examiner—A. D. Pellinen
Assistant Examiner—Geoffrey S. Evans
Attorney, Agent, or Firm—Finnegan, Henderson, Farabow, Garrett & Dunner

[57] ABSTRACT

A traveling-tape electroerosive cutting method and apparatus utilizing a tape supporting guide bar having two opposite, elongate surfaces extending parallel to its longitudinal axis. The bar penetrates the workpiece from one side to the other side to bring the tape advancing between its dispensing site and takeup site into form engagement with those elongate surfaces which are shaped to enable those portions of the traveling tape which are respectively in engagement with the elongate surfaces together form an active electrode surface of convexity generally V-shaped in section and juxtaposed with the workpiece across a fluid-filled machining gap.

10 Claims, 4 Drawing Figures

ELECTROEROSIVE CUTTING METHOD AND APPARATUS WITH A BAR-SUPPORTED ELECTRODE TAPE

FIELD OF THE INVENTION

The present invention relates to tape-cut electroerosion and, more particularly, to a method of and apparatus for cutting an electrically conductive workpiece with a traveling tape electrode.

BACKGROUND OF THE INVENTION

Wire-cut electroerosion, also called traveling-wire electroerosion, is well known in which an electrode wire axially advancing from a wire dispensing site to a wire takeup site is supported by a pair of wire guide members disposed at opposite sides of a workpiece. These guide members are provided to establish a straight-line path which traverses the workpiece and along which the wire is desired to travel to provide a renewing elongate electrode surface for electroerosively cutting the workpiece along a programmed cutting path in a plane transverse to the renewing electrode surface. While the renewing electrode surface must be of high straightness to assure due electroerosive cutting accuracy, it has been found that the wire in the cutting zone tends to bend backwards and uncontrolledly fluctuate in position due to a machining pressure that develops in the erosion gap, thus limiting the cutting accuracy obtainable. Furthermore, the wire, as thin as 0.5 mm or less in all sectional directions, inherently breaks once some excessive thermal stress concentrates in the cutting zone.

Instead of a wire, a tape-form electrode may be employed to provide a breakage-free traveling-electrode cutting operation. Also, when oriented to make its width in alignment with a cutting direction, the electrode tape is highly resistant to deflection and mispositioning. When the cutting direction changes, however, the tape must be inclined and such positioning stability of the tape is no longer the case. Since the erosion gap then lies defining with one lateral surface of the tape, the tape tends to deflect backwards. Thus, while a tape-form electrode gives rise to substantially greater advantages than a wire-form electrode as used in traveling-wire electroerosive cutting operations, it has been found that there still remain severe limitations in improving the cutting accuracy and efficiency achievable in those operations.

OBJECTS OF THE INVENTION

Accordingly, the present invention seeks to provide a new and improved tape-cut electroerosion method and apparatus utilizing a traveling tape electrode.

SUMMARY OF THE INVENTION

In accordance with the present invention there is provided, in a first aspect thereof, a method of cutting an electrically conductive workpiece with an electrode tape, which method comprises: advancing the electrode tape from a tape dispensing site towards a tape takeup site; guiding the advancing tape in a continuous tape travel path between the dispensing site and the takeup site by means of a rigid, straight bar penetrating the workpiece from one side to the other side thereof so that the tape advancing longitudinally engages two opposite, elongate side surfaces of the bar which extend parallel to its longitudinal axis and that portions of the advancing tape respectively in longitudinal engagement with the said elongate side surfaces together form a renewing elongate electrode surface of convexity essentially V-shaped in cross section and spacedly juxtaposed with the workpiece across a fluid flushed machining gap; and relatively displacing the bar and the workpiece in a plane transverse to the said longitudinal axis while passing an electroerosive machining current between the electrode surface and the workpiece across the gap to advance erosive material removal in the workpiece.

According to one specific feature embodying the invention, the tape dispensing site and the tape takeup site are both disposed at the said one of the workpiece and the said two opposite, elongate surfaces define generally parallel portions of the continuous tape travel path which bidirectionally traverses the workpiece.

According to another feature embodying the invention, the tape takeup site is disposed at the said other while the tape dispensing site is disposed at the one side of the workpiece, and the electrode tape is folded about its longitudinal center line to bring the tape into engagement with the two opposite, elongate side surfaces of the bar in the workpiece.

Preferably, the bar is rotatable with a variable angle of rotation about the longitudinal axis, the method further comprising changing the angle of rotation of the bar to change the direction in which the apex of said machining surface is oriented during the material removal being advanced.

The invention also provides, in a second aspect thereof, an apparatus for cutting an electrically conductive workpiece with an electrode tape, which comprises: a tape dispensing means; a tape takeup means; means for advancing the electrode tape from the dispensing means towards the takeup means; a tape guiding system comprising a rigid, straight bar adapted to penetrate the workpiece from one side to the other side thereof for guiding the advancing tape in a continuous tape travel path between the dispensing means and the takeup means so that the advancing tape longitudinally engages two opposite, elongate side surfaces of the bar extending parallel to its longitudinal axis and that portions of the advancing tape respectively in longitudinal engagement with the said elongate side surfaces together form a renewing-elongate electrode face of convexity essentially V-shaped in cross section and spacedly juxtaposed with the workpiece across a fluid flushed machining gap; and means for relatively displacing the bar and the workpiece in a plane transverse to said longitudinal axis while an electroerosive machining current is passed between the said renewing electrode face and the workpiece across the machining gap to advance erosive material removal in the workpiece.

Specifically, the tape dispensing means and the tape takeup means may be both disposed at the one side of the workpiece so that the said two opposite, elongate side surfaces define generally parallel portions of the continuous tape travel path which bidirectionally traverses the workpiece.

Alternatively, the tape takeup means may be disposed at the other side while the tape dispensing means is disposed at said one side of the workpiece, the apparatus further comprising means for folding the electrode tape about its longitudinal center line to bring the tape into engagement on the two opposite, elongate side surfaces of the bar in the workpiece.

Preferably, the said bar is rotatable with a variable angle of rotation about the said longitudinal axis, the apparatus further comprising means for changing the angle of rotation of the bar to change the direction in which the apex of the said machining face is oriented during the material removal being advanced.

BRIEF DESCRIPTION OF THE DRAWING

These and other features of the invention as well as advantages thereof will become more readily apparent from a reading of the following description taken with reference to the accompanying drawings in which.

SPECIFIC DESCRIPTION

Figure 1:
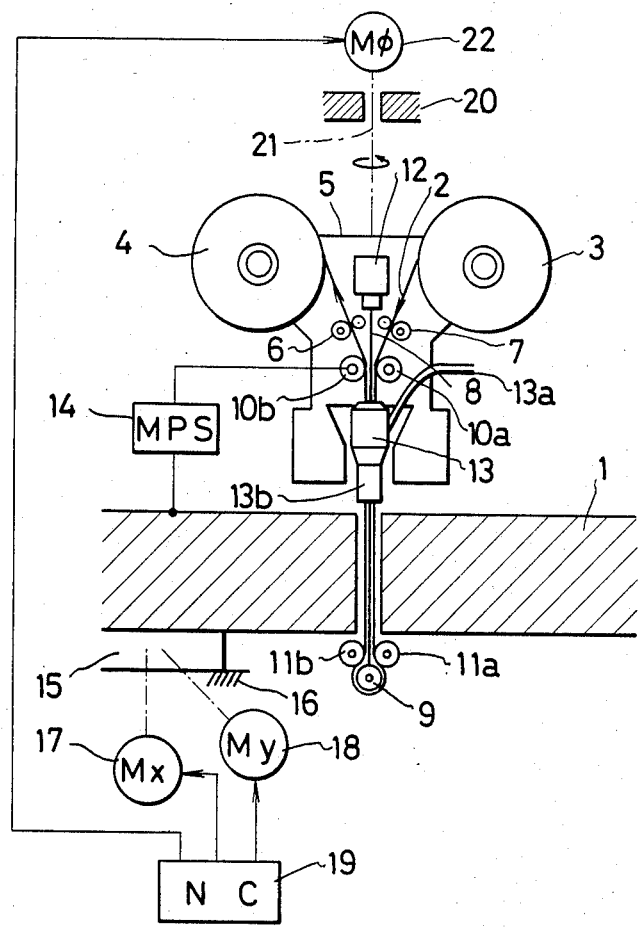
FIG. 1 is an elevational view, in section, diagrammatically illustrating a traveling-tape electroerosive cutting system according to the present invention.
Figure 2:
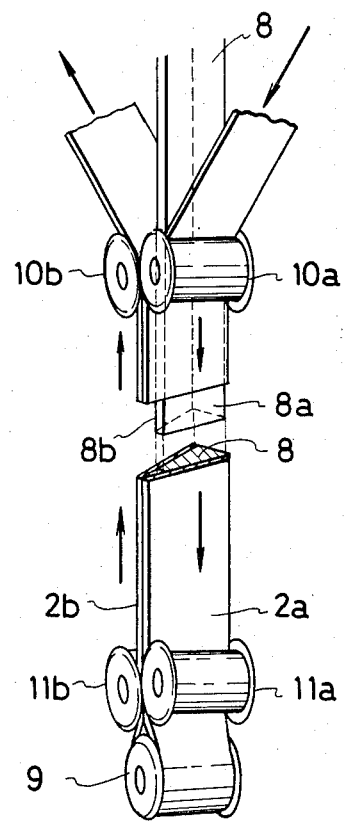
FIG. 2 is a perspective view diagrammatically illustrating a supporting guide bar, guide rollers and an electrode tape guided thereby to provide a V-shaped machining electrode surface.
Figure 3:
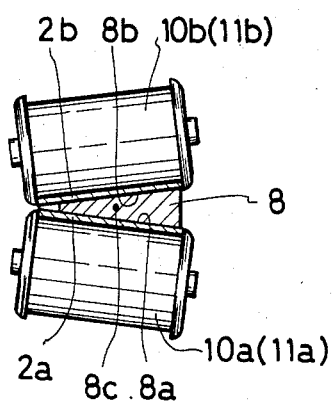
FIG. 3 is a plan view diagrammatically illustrating the electrode tape guided by the bar and each pair of the supporting rollers in the arrangement shown in FIGS. 1 and 2.
Figure 4:
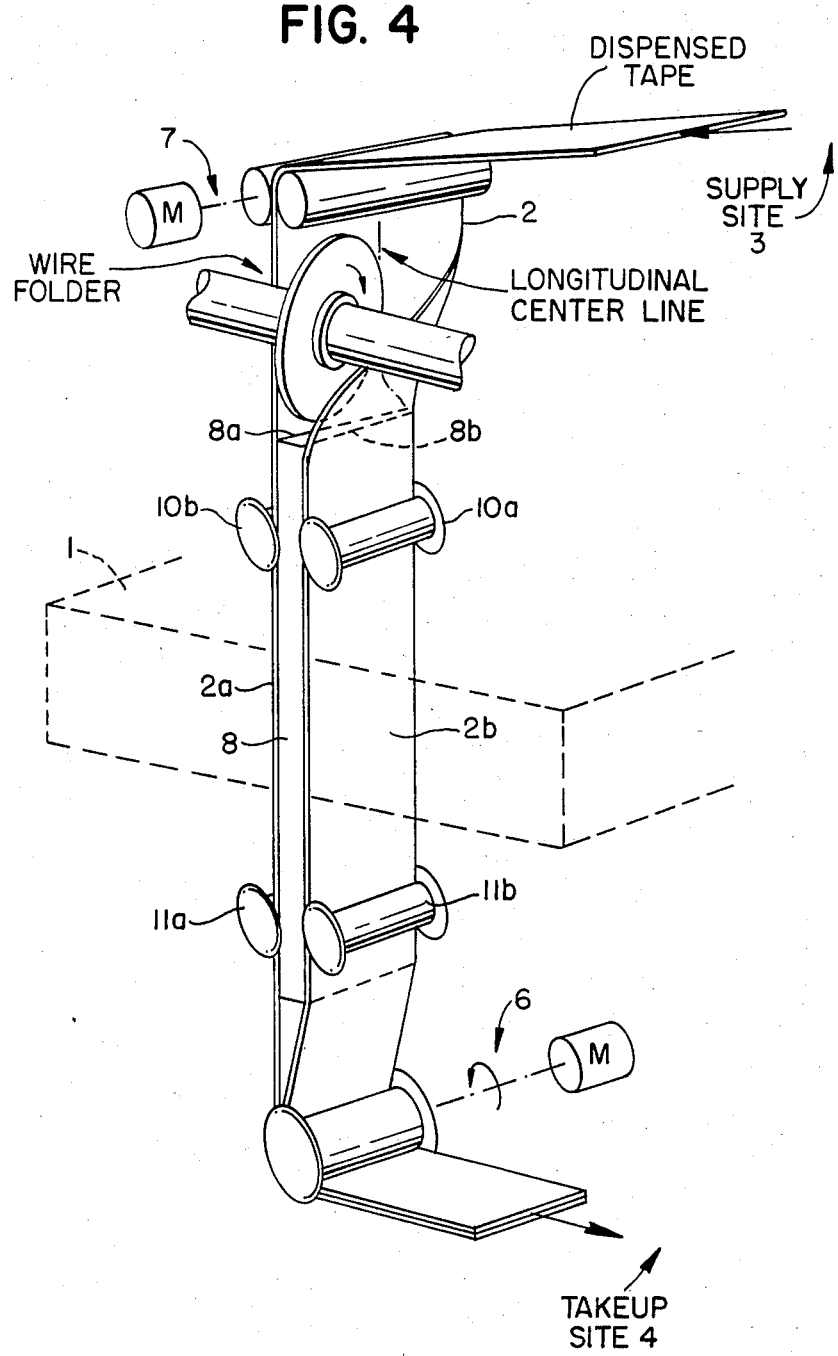
FIG. 4 is an elevational view, in section, diagrammatically illustrating an alternative embodiment of a travelling-tape erosive cutting system according to the present invention.

Referring now to FIGS. 1-3 there is shown an improved system for electroerosively cutting an electrically conductive workpiece 1 with a continuous electrode tape 2 which is advanced from a tape supply reel 3 towards a tape collection reel 4. The supply and collection reels 3 and 4 are both mounted on a common carriage 5 which is disposed at the upper side of the workpiece 1. The electrode tape 2 is dispensed from the supply reel 3 and advanced along a continuous path of travel by a driving capstan and pinch roller unit 6, the path terminating at the collection reel 4. A braking roller unit 7 is provided to apply a tension to the advancing tape 2. The units 6 and 7 are mounted on the carriage 5.

The tape 2 between the braking unit 7 and the drive unit 6 is supported by a guide system which includes a rigid straight bar 8 vertically penetrating the workpiece 1 from the upper side to the lower side thereof and terminating at a guide roller 9. The tape 2 is supported by the bar 8 so that it longitudinally engages two opposite, elongate side surfaces 8a and 8b of the bar which extends parallel to a longitudinal axis 8c thereof and that portions 2a and 2b of the advancing tape 2 respectively in longitudinal engagement with the bar surfaces 8a and 8b form a renewing elongate electrode face of convexity generally V-shaped in cross-section and juxtaposed with the workpiece 1 across the fluid-filled machining gap. Here, the two opposite, elongate side surfaces 8a and 8b of the bar 8 define portions of the continuous tape travel path which bidirectionally transverses the workpiece 1. Further, two pairs of guide rollers 10a, 10b; and 11a, 11b are arranged at the upper and lower sides of the workpiece 1, respectively, to hold these traveling portions 2a and 2b of the tape 2 in firm engagement with the supporting surfaces 8a and 8b, respectively. The vertical guide bar 8 is securely supported by support member 12 which in turn is securely mounted on the carriage 5.

The carriage 5 also carries a fluid delivery unit 13 in the form of a nozzle longitudinally traversed by the guide bar 8 and the tape portions 2a and 2b moving in engagement therewith. The nozzle 13 has an inlet conduit 13a communicating with a source of the machining fluid and an outlet nozzle opening 13b adjacent the upper surface of the workpiece 1 for supplying the machining fluid into the cutting zone in the workpiece.

A machining power supply 14 has one terminal electrically connected to the workpiece 1 and the other terminal to guide roller 10b as shown for passing an electroerosive machining current between the renewing machining surface 2a, 2b, and the across the fluid-filled erosion gap to remove material from the workpiece 1.

The material removal is continued as the machining surface 2a, 2b and the workpiece are relatively displaced in a plane (X-Y) orthogonal or transverse to the bar 8. In the embodiment illustrated, the workpiece 1 is arranged to be displaceable while the bar axis 8c is stationary. The workpiece 1 is thus securely mounted on a compound worktable 15 which is movably supported on a machine base 16. The worktable 15 is displaced in the X-Y plane by means of a pair of motors 17 (Mx) and 18 (My) controlledly driven by command signals furnished from an NC unit 19. The drive command signals are produced in the control unit 19 from path data for the bar axis 8c to be translationally displaced relative to the workpiece 1, which data are in turn derived from geometrical data defining a contour of cut to be formed in the workpiece 1. Thus, the V-shaped machining surface 2a, 2b firmly supported by the bar surfaces 8a, 8b can be effectively displaced simply translationally along the prescribed path in a given coordinate system to progressively generate the desired contour of cut in the workpiece 1 with at least a portion of the renewing surface 2a, 2b at each cutting block.

Depending on the shape of the contour of cut to be generated, it is necessary or desirable that the direction in which the apex of the V-shaped machining surface be changed in the coordinate system. Thus, the carriage 5 supporting the bar 8 (as well as the reels 3 and 4 etc) is supported on a machine frame 20 rotatably about a rotary axis 21 which is advantageously coincident with the axis 8c of the bar 8. The carriage 5 and hence the bar 8 is rotated about the vertical axis 21, 8c by a motor 22 in response to a command signal from the NC unit 19 so as to change the orientation of apex of the V-shaped machining surface 2a, 2b from a previous programmed direction to a next programmed direction where a change in the orientation is required on the programmed path of translational displacement of the bar axis 8c.

In a modification of the arrangement shown utilizing the guide bar 8, the takeup reel 4 and the tape drive unit 6 may be disposed at the other side (e.g. lower) of the workpiece 1 while the supply reel 3 and the tape braking unit 7 are disposed at one side (e.g. upper) of the workpiece 1 so that the tape 2 dispensed traverses the workpiece unidirectionally (from up to down). Then, the guide roller 9 is removed. Between the brake unit 7 and the guide rollers 10a, 10b there is provided means for folding the dispensed tape 2 about its longitudinal center line to bring the tape into engagement with the two opposite, elongate side surfaces 8a, 8b of the guide bar 8 so that portions 2a, 2b of the folded tape moving respectively in engagement with these surfaces 8a, 8b together form a V-shaped machining electrode surface. Here again, the pairs of the guide rollers 10a, 10b; 11a, 11b serve to hold the traveling (here unidirectionally) tape portions 2a, 2b in firm engagement with the opposite two supporting surfaces 8a, 8b of the guide bar 8.

What is claimed is:

1. A method of cutting an electrically conductive workpiece with an electrode tape, comprising the steps of:

advancing the electrode tape from a tape dispensing site toward a tape takeup site;

guiding the advancing tape in a continuous tape travel path from the dispensing site through the workpiece to the takeup site by means of a rigid, straight bar extending through the workpiece from one side to the other side thereof, said bar having a V-shaped cross section defining two opposed planar side surfaces extending parallel to its longitudinal axis, portions of said advancing tape respectively engaging said opposed side surfaces forming a continually renewing V-shaped elongated electrode machining surface in spaced juxtaposition with a fluid-flushed machining gap extending through said workpiece; and relatively displacing the bar and the workpiece in a plane transverse to said longitudinal axis while passing an electroerosive machining current between said electrode surface and the workpiece across the gap to advance erosive material removal in the workpiece.

2. The method defined in claim 1 wherein said tape dispensing site and said tape takeup site are both disposed at said one side of the workpiece and said two opposite, elongate side surfaces define portions of the continuous tape travel path which bidirectionally traverses the workpiece.

3. The method defined in claim 1 wherein said takeup site is disposed at said other side while said dispensing site is disposed at said one side of the workpiece, and said electrode tape is folded about its longitudinal center line to bring the tape into engagement with said two opposite, elongate side surfaces of the bar in the workpiece.

4. The method defined in claim 1, claim 2 or claim 3 wherein said bar is rotatable with a variable angle of rotation about said longitudinal axis, further comprising the step of changing the angle of rotation of the bar to change the direction in which the apex of said machining surface is oriented during the material removal being advanced.

5. An apparatus for cutting an electrically conductive workpiece with an electrode tape, comprising:

a tape dispensing means;

a tape takeup means;

means for advancing the electrode tape from the dispensing means towards the takeup means;

a tape guiding system comprising a rigid, straight bar having a V-shaped cross section and an elongated length greater than the thickness of said workpiece, said bar defining two opposed planar side surfaces extending parallel to its longitudinal axis and being disposed to extend through the workpiece from one side to the other side thereof, and means for placing portions of said advancing tape respectively into longitudinal engagement with the opposed surfaces of said bar, said system guiding the advancing tape in a continuous tape travel path from the dispensing means through the workpiece to the take-up means to form a continually renewing V-shaped elongated electrode machining surface in spaced juxtaposition with a fluid-flushed machining gap extending through the workpiece; and means for relatively displacing said bar and the workpiece in a plane transverse machining to said longitudinal axis while an electroerosive machining current is passed between said renewing electrode face and the workpiece across the machining gap to advance erosive material removal in the workpiece.

6. The apparatus defined in claim 5 wherein said tape dispensing means and said tape takeup means are both disposed at said one side of the workpiece and said two opposite, elongate side surfaces define portions of the continuous tape travel path which bidirectionally traverses the workpiece.

7. The apparatus defined in claim 5 wherein said takeup means is disposed at said other side while said dispensing means is disposed at said one side of the workpiece, further comprising means for folding said electrode tape about its longitudinal center line to bring said tape into engagement on said two opposite, elongate side surfaces of the bar in the workpiece.

8. The apparatus defined in claim 5, claim 6 or claim 7 wherein said bar is rotatable with a variable angle of rotation about said longitudinal axis, further comprising means for changing the angle of rotation of the bar to change the direction in which the apex of said machining surface is oriented during the material removal being advanced.

9. The apparatus defined in claim 6, further comprising means for reversing direction of the tape travel path, said reversing means disposed on said rigid straight bar at said other side of said workpiece, said reversing means disposed at a point along said travel path substantially equidistant from said dispensing means and said takeup means.

10. The apparatus as defined in claim 9, wherein said reversing means comprises a roller.

* * * * *